Dec. 8, 1953 S. A. SCHERBATSKOY 2,662,168

SYSTEM OF DETERMINING THE LISTENING HABITS OF WAVE SIGNAL RECEIVER USERS

Filed Nov. 9, 1946 4 Sheets-Sheet 1

INVENTOR.
Serge A. Scherbatskoy
BY Mueller and Mason
Attorneys

Dec. 8, 1953    S. A. SCHERBATSKOY    2,662,168

SYSTEM OF DETERMINING THE LISTENING HABITS OF WAVE SIGNAL RECEIVER USERS

Filed Nov. 9, 1946    4 Sheets-Sheet 2

*INVENTOR.*
Serge A. Scherbatskoy

*BY* Mueller and Mason

Attorneys

INVENTOR.
Serge A. Scherbatskoy
BY Mueller and Mason
Attorneys

Dec. 8, 1953 S. A. SCHERBATSKOY 2,662,168

SYSTEM OF DETERMINING THE LISTENING HABITS OF WAVE SIGNAL RECEIVER USERS

Filed Nov. 9, 1946 4 Sheets-Sheet 4

INVENTOR.
Serge A. Scherbatskoy
BY Mueller and Mason
Attorneys

UNITED STATES PATENT OFFICE 2,662,168

SYSTEM OF DETERMINING THE LISTENING HABITS OF WAVE SIGNAL RECEIVER USERS

Serge A. Scherbatskoy, Tulsa, Okla.

Application November 9, 1946, Serial No. 709,018

8 Claims. (Cl. 250—2)

Figures 1, 3:
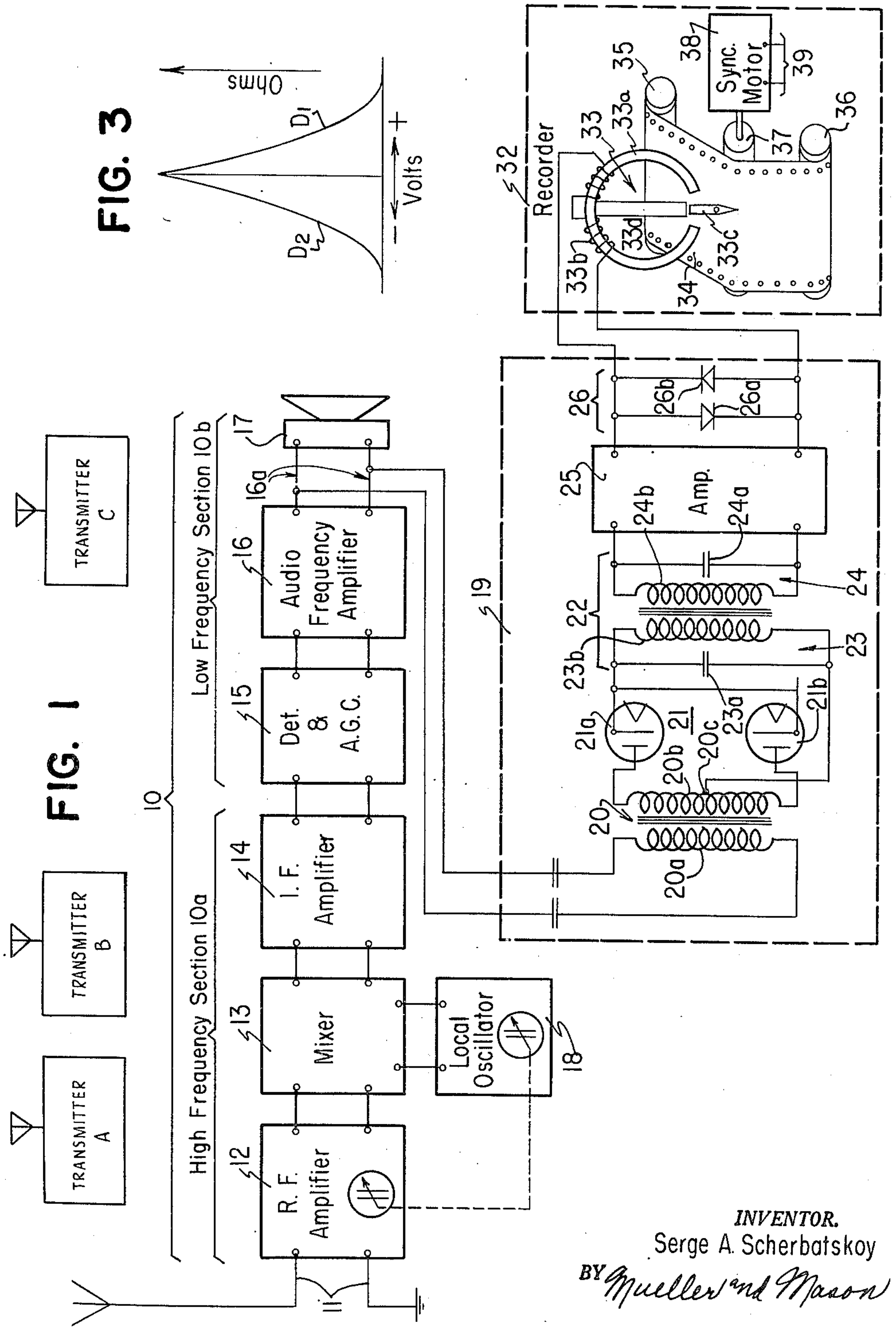

The present invention relates to systems and apparatus for determining the listening habits of users of wave signal receivers of the broadcast type and more particularly to improvements in systems and apparatus for determining the audience popularity or rating of particular programs transmitted from one or more wave signal transmitters and for gathering other information of great importance in determining the effectiveness of radio advertising.

Generally speaking the effectiveness of any particular radio program as an advertising media is directly related to such factors as the following:

1. The average size of the listening audience.
2. The average period of listening to a particular program, i. e. the "holding power" of the program.
3. Variations in the size of the listening audience on a function of time basis in order (*a*) to permit detection of program components which cause audience gains or losses, (*b*) to determine which types of commercial message cause audience loss, and (*c*) to locate commercials during program periods when the audience is large, etc.

The first method of sampling used in attempts to obtain this information is the so-called telephone call method which involves the making of hundreds of personal telephone calls to random selected radio audience homes during the period when a particular program of interest is in progress and statistical analysis of the results to determine the extent of listening. Basically, there are a number of defects in this method which destroy the accuracy of the results obtained. Thus it is entirely impossible to obtain information concerning factors 2 and 3 above when this method of sampling is used. These defects have led to the development of instrumented methods of sampling which do not require active audience collaboration, provide a great deal more important information than the telephone call sampling technique, and eliminate entirely the statistical error resulting from the random selection feature of the telephone call sampling technique, as well as many other defects impairing the accuracy of the results arrived at when this technique is employed.

Instrumentation involves the use of a recording device operating in conjunction with each collaborator receiver used in the sampling system to record the extent of use of the receiver and to record, as a function of time, the transmitters to which the receiver is tuned for program reception. In general, two different types of recording device have been used to produce a record of the extent of receiver use and the particular transmitters to which the receiver is tuned for program reception during a predetermined calendar period. The first, or all-mechanical type of device, employs a mechanical connection between the tuning shaft of the ganged condensers of a receiver and a recording stylus to move the stylus transversely of a record tape (driven at a constant speed) in accordance with the angular setting imparted to the condenser tuning shaft. While this type of device is entirely satisfactory in operation, it is not adaptable for use in conjunction with all makes and types of broadcast receivers. Moreover, the recording precision of the device falls off and record interpretation difficulties increase when the device is used to record signals received over carrier channels located in the higher frequency bands (FM and television) of the frequency spectrum. The second type of recording device is of the electromechanical type in that an electromechanical translating system is interposed between the high frequency signal channel of the receiver and the station recording stylus to control the movement of the stylus in its operation to record on a time basis the particular transmitters from which programs are received. Usually, a recorder of this character utilizes signal energy derived from the local oscillator of the receiver to determine the setting of the station recording stylus. In this form of device also, the accuracy of recording decreases and record interpretation difficulties increase when the device is used to record signals received over carrier channels located in the higher frequency bands of the frequency spectrum. Moreover, a considerable amount of relatively temperamental equipment is required in order accurately to translate changes in the local oscillator output frequency into corresponding changes in the setting of the station recording stylus of the device.

Thus, none of the recording devices heretofore used in a system of the character described provide positive transmitter or program identification. Further, they do not operate to form a record of station or transmitter choice which is susceptible of automatic decoding. Moreover, commercially available devices of the two types referred to are generally expensive to manufacture, install and service in the field.

It is an object of the present invention, therefore, to provide a new and improved system for determining the listening habits of users of wave signal receivers.

It is another object of the invention to provide in a system of the character described improved program recording facilities which obviate the problems referred to above.

It is a further object of the invention to provide simple, reliable and relatively inexpensive instruments adapted for use at the receiver of each collaborator in a system of the character described, and also permits relatively simple and highly reliable equipment to be used in translating the records into statistically analyzable form.

According to a further object of the invention, the program identification recording operation is simplified and rendered more infallably accurate, and the problems outlined above are largely obviated, by utilizing energy extracted from the audio frequency program transmitting channel of each receiver to produce a distinguishable record of each received program.

In accordance with a further object of the invention, the audio frequency program signals utilized in the production of program identifying records are converted into subaudible signals representative of the dynamic pattern of the received programs prior to recording, whereby slow speed record tape movement may be used with a resultant saving in the amount of record tape used in a given calendar period.

According to a still further object of the invention, facilities are provided for producing distinguishable program identification records of the same network program which may be receivable at a given receiver from any one of a plurality of wave signal transmitters, thus providing for record identification of both the program and the transmitter from which the program is received.

Figure 2:
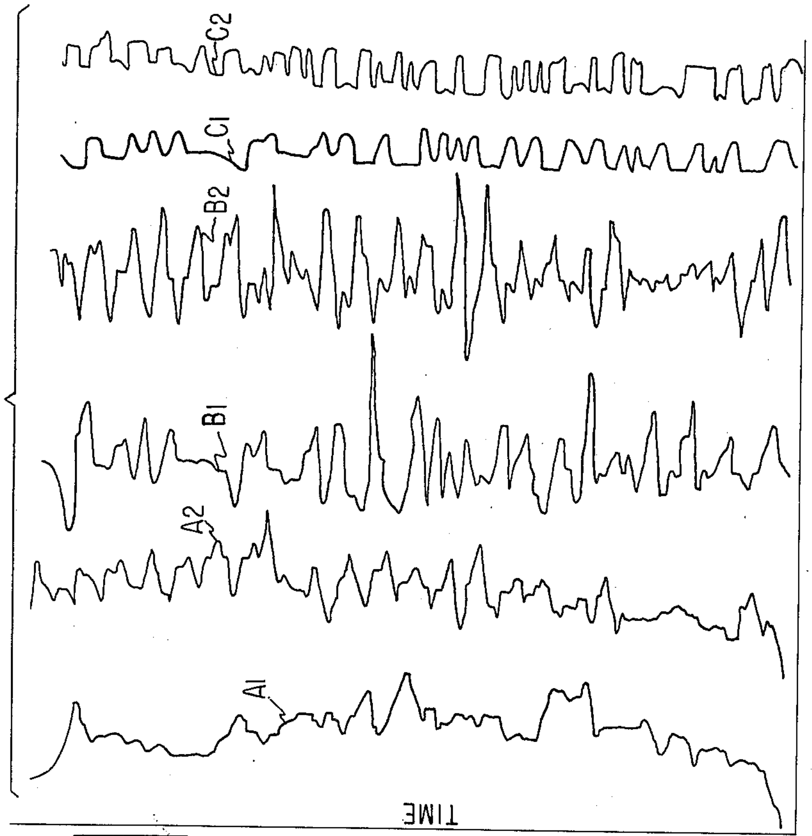
Figure 4A:
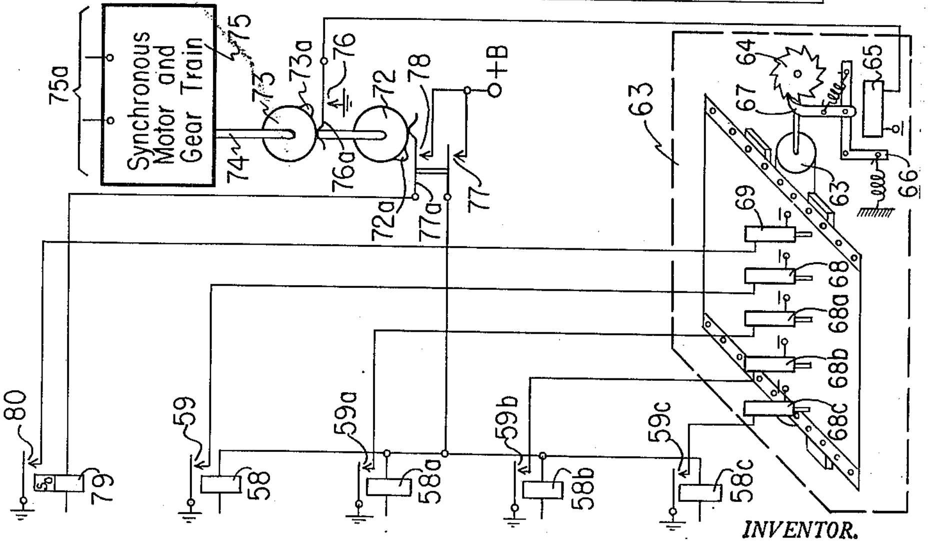
Figure 4:
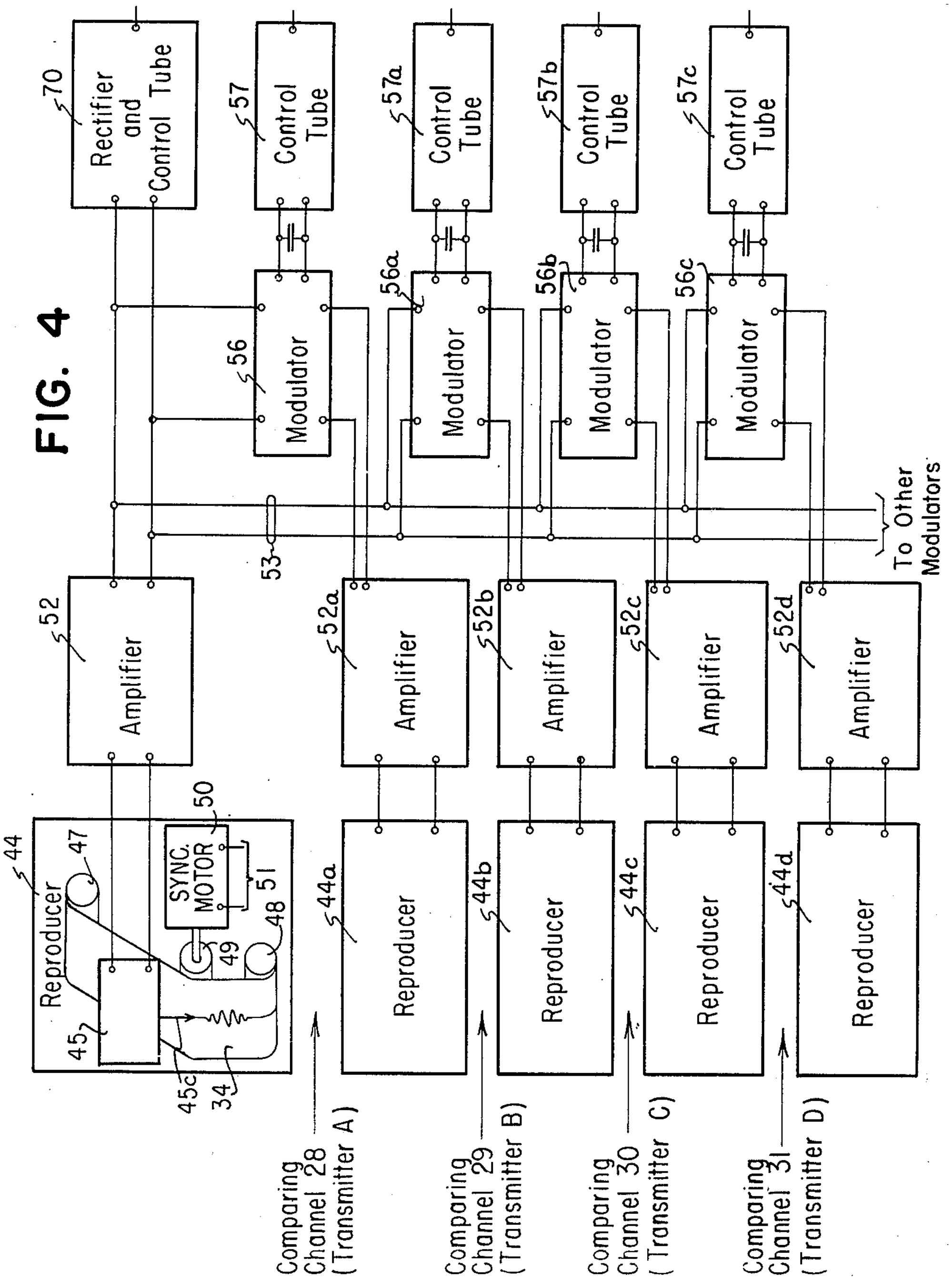
Figures 5, 6, 7:
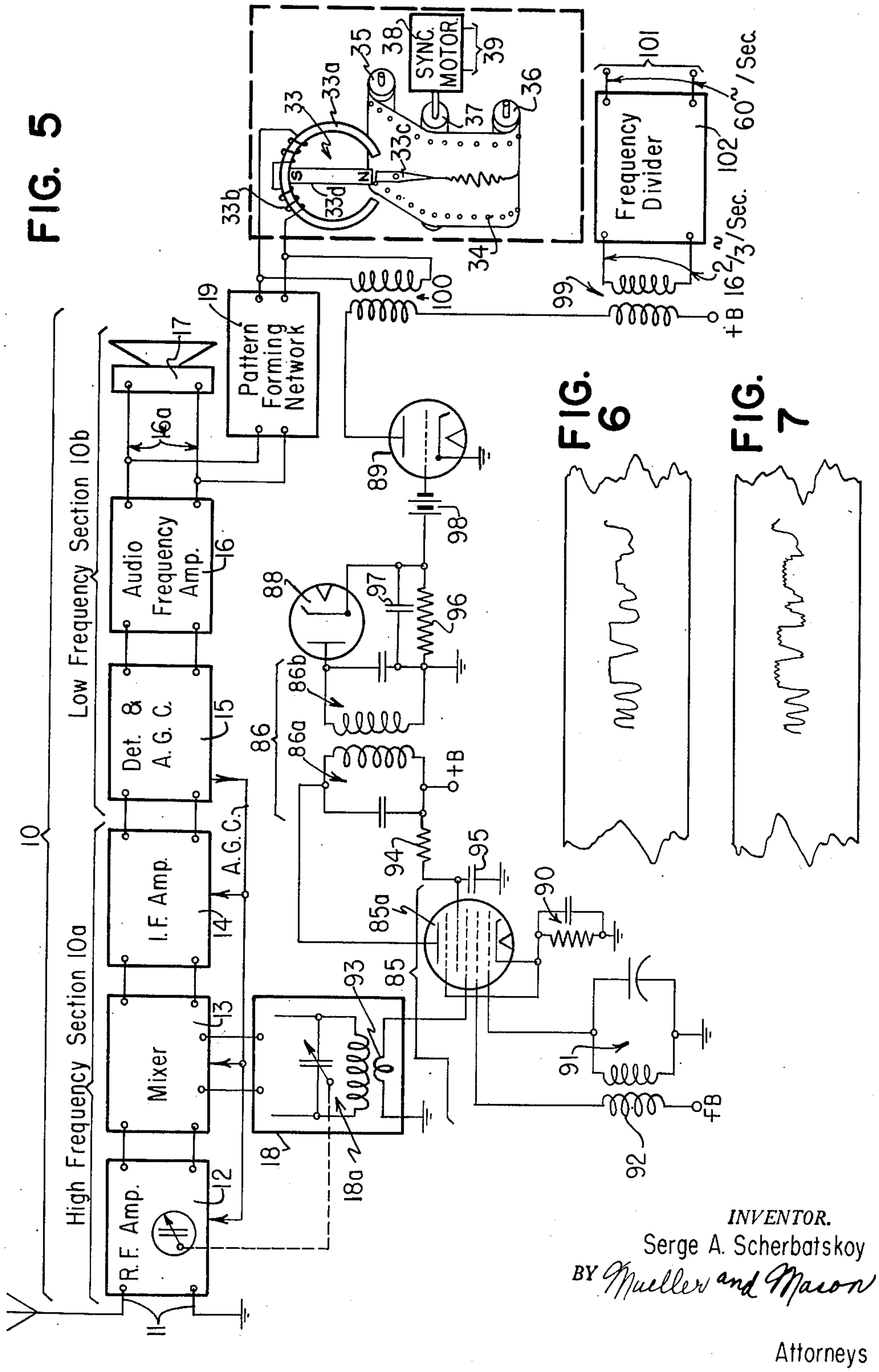

The invention, both as to its organization and method of operation, together with further objects and advantages thereof, will best be understood by reference to the following specification taken in connection with the accompanying drawings, in which:

Fig. 1 schematically illustrates the present improved program recording apparatus as combined with a wave signal receiver of conventional type;

Figs. 2 and 3 are graphs illustrating certain operating characteristics of the apparatus;

Figs. 4 and 4A when placed end to end in the order named schematically illustrate the reproducing and translating equipment utilized to translate the record formed by the recording apparatus shown in Fig. 1 into statistically analyzable form;

Fig. 5 schematically illustrates a modification of the recording apparatus which may be provided in conjunction with certain of the receivers included in the system; and Figs. 6 and 7 illustrate typical record segments produced through operation of the apparatus shown in Fig. 5.

Referring now to the drawings and more particularly to Fig. 1 thereof, the present improved program recording apparatus is there illustrated in combination with a wave signal receiver 10 adapted for conventional broadcast receiver use in the home of a collaborator in the sampling system and comprised of a high frequency section 10a followed by a low frequency section 10b. This receiver may be of any desired commercial type and is illustrated as being of the well known superheterodyne type. Briefly, it comprises an antenna-ground circuit 11, a tunable radio frequency selector and amplifier 12, a mixer or modulator 13, an intermediate frequency amplifier 14, a detector and automatic gain control unit 15, an audio frequency amplifier 16 and a transducer or loud speaker 17 connected in tandem in the order named. The usual local or beat frequency oscillator 18 is provided at the mixer stage 13 for heterodyning a received program signal carrier to a fixed intermediate frequency. To this end, the tunable frequency determining circuit of the oscillator 18 is arranged to be gang tuned with the selective circuits of the radio frequency amplifier 12.

In general, the receiver 10, as described above, is entirely conventional in arrangement and its mode of operation is well understood in the art. Briefly, however, program modulated carrier signals intercepted by the antenna-ground circuit 11 are selected and amplified in the radio frequency amplifier 12, converted into a modulated carrier of fixed frequency in the mixer 13, further selected and amplified in the intermediate frequency amplifier 14, and detected in the detector and automatic gain control unit 15. The program or modulation components thus developed at the output side of the unit 15 are amplified by the audio frequency amplifier 16 and delivered over the voice coil leads 16a to the loud speaker 17 for reproduction. Automatic gain control of one or more of the receiver stages 12, 13 and 14 under the control of the gain control bias developed in the unit 15 is accomplished in an entirely conventional manner.

Although a single receiver has been described by way of illustration, it will be understood that in actual practice several hundred broadcast receivers located in homes within the radiation areas of different sets of wave signal transmitters broadcasting the particular programs of interest are employed to provide the record information concerning the listening habits of the receiver users necessary to a statistical analysis from which the above-enumerated factors all effecting the sales effectiveness of particular programs may be accurately arrived at. In using the system, it is contemplated that selection of the system collaborator homes, i. e. the homes in which wave signal receiver use is to be logged, shall be on a basis such that all of the variable factors, such, for example, as number of potential listeners, economic affluence, religion, etc. which normally affect any process of sampling public opinion are accounted for on an average basis. In the interests of simplifying the disclosure, however, only a single wave signal receiver 10 and associated recording facilities has been illustrated in the drawings. While this receiver has been shown as being of the audio reproducing type, it will be understood from the following explanation that the present improved system is equally applicable for use in determining the listening habits of television receiver users. Accordingly, the terms "program" and "program signals" as used herein denote either audio or video programs or the signal modulation components of low (not carrier) frequency used in radiating such programs from wave signal transmitters for reception and reproduction.

For the purpose of producing a reproducible record identifying all programs received at the respectively collaborator receivers used in the system, each receiver is in accordance with the present invention provided with means electrically coupled to the audio frequency program signal channel thereof (the low frequency section 10b of the receiver 10) for utilizing the audio frequency program signals to produce a phonographically reproducible and decodable record of the programs received. Briefly, the apparatus provided in association with the collaborator receiver 10 comprises a tape recorder 32, a full wave rectifier 21 having its input terminals coupled to the low frequency section 10b, i. e. the voice coil leads 16a, of the receiver 10, a band pass filter 22 for passing frequencies within a predetermined sub-audible frequency range, a low frequency amplifier 25 for amplifying the low frequency signals passed by the filter 22, and a limiter 26 for limiting the amplitude of the signals delivered from the amplifier to the driving coil 33b of the recording head 33 embodied in the recorder 32. Preferably, this recorder is of the commercial type described, for example, in "Radio News," June 1946 pp. 36–108, embodying a tape movable between a supply spool 35 and a take-up spool 36 and driven at a constant speed by a sprocket 37 having spaced peripheral teeth engageable with edge perforations in the tape 34. Constant speed rotation of the sprocket 37 is obtained by shaft connecting this sprocket ot a synchronous motor and gear train unit 38, the synchronous motor of which is adapted for energization from any commercial source of alternating current of constant frequency indicated by the bracketed terminals 39. High fidelity recording on the tape 34 is obtained by employing a jewel tipped cutting stylus 33c pivotally supported as a part of the recording head 33 and having an armature end disposed in the air gap conventionally provided in the field structure 33a of this head. As shown, the recording head 33 is of the permanent magnet polarized type, including as a part of its field structure a permanent polarizing magnet 33d which normally maintains the armature end of the stylus 33c in a neutral position between the pole face ends of the field structure.

More specifically considered, the audio signal voltage appearing across the voice coil leads 16a during reception of a program by the receiver 10 is impressed across the primary winding 20a of a coupling transformer 20 having its secondary winding 20b center tapped as indicated at 20c. This center tap is connected to the cathodes of two oppositely poled diode rectifiers 21a and 21b and also to the first section 23 of the filter 22. The anodes of the rectifiers 21a and 21b are connected respectively to the opposed outer terminals of the secondary winding 20b. Preferably the filter 22 is of the illustrated double tuned type although alternatively, this filter may be of the well known electromechanical type embodying a tuned vibrating reed, a driving coil included in the full wave rectifier circuit and a pick-up coil bridged across the input terminals of the amplifier 25. As shown, it comprises a condenser 23a and and inductance element 23b connected in parallel to form a first filter section 23 which is inductively coupled to the second filter section 24 similarly comprised of a parallel connected inductance element 24b and condenser 24a. In order that this filter will pass only signal frequency components which are representative of the dynamic pattern of the program signals appearing in the audio frequency channel extending through the low frequency section 10b of the receiver, the circuit components thereof are designed to limit the pass band of the filter to frequencies within a predetermined subaudible range. Specifically, it has been found that by designing this filter to pass frequencies within the band of .3 to 1 cycle per second, the voltage developed at the output side thereof is of a pattern uniquely representative of the dynamic pattern of the program signals appearing across the voice coil leads 16a. The amplifier 25 must, of course, be capable of amplifying these low frequency signals without appreciable distortion. Conventional amplifiers capable of satisfactory operation to perform this function are well known in the art. The limiter 26 is comprised of two oppositely poled selenium rectifier cells 26a and 26b which are bridged across the output terminals of the amplifier 25. These rectifiers, in combination, function to limit the amplitude of the signals appearing across the output terminals of the amplifier 25 in the manner more fully explained below.

With the apparatus thus connected and arranged and with the driving coil 33b connected to the output terminals of the limiter 26 for energization in accordance with the signals passed by the filter 22 and amplified and limited by the amplifier 25 and limiter 26, the jeweled cutting tip of the stylus 33c is vibrated in accordance with the signal voltage impressed thereon to produce a wave record upon the cellophane record tape 34 uniquely identifying each program received by the receiver 10, which record is capable of phonographic reproduction or translation on an automatic basis. Since, as explained above, the frequencies of the signals developed at the output side of the limiter 26 are of a very low order of magnitude, it will be readily apparent that they may be accurately recorded with the tape 34 travelling at a very low speed. Hence, with the recorder 32 in continuous operation, the amount of tape used per unit time interval is reduced to a minimum.

For the purpose of translating the program identification signals as recorded upon the cellophane record tapes at the various collaborator receivers employed in the system into statistically analyzable form, a system of record tape comparison is employed. Specifically, and as pointed out more fully below, each record tape as taken from recording apparatus employed at each collaborator receiver is electrically compared with the signals recorded on record tapes taken from a plurality of monitoring receivers. The program recording apparatus combined with each monitoring receiver is identical with that provided at each collaborator receiver and described above. These monitoring receivers are tuned so that each continuously monitors a particular wave signal transmitter capable of being received by certain collaboration receivers. Specifically, each tape taken from the receiver 10, for example, is matched against or compared as to signal pattern with record tapes taken from the recording apparatus associated with monitoring receivers which respectively and continuously monitor all of the wave signal transmitters normally received by the receiver 10. In the ordinary use of a broadcast receiver, programs radiated from not more than ten or fifteen signal transmitting stations are ordinarily listened to by the receiver user. This, of course, means that in the comparison operation, the record tapes taken from the receiver 10, for example, need only be compared with record tapes taken from the recording devices associated with not more than ten or fifteen monitoring receivers in order to determine what programs were listened to by the user or users of the receiver 10.

In order rapidly to obtain record tape comparison, the translating equipment schematically illustrated in Fig. 4 of the drawings may be employed. In brief, this equipment, which in practice is located at a central office to which the record tapes taken from the recording devices associated with the collaborator and monitoring receivers are delivered, comprises a plurality of reproducing units 44, **44*a*, 44*b*, 44*c*, 44*d*, etc., the first of which may be employed to reproduce the record made at the collaborator receiver 10, for example, and the others of which may be employed to reproduce the records taken from the recorders associated with the receivers used in monitoring the wave signal transmitters from which the receiver 10 normally receives radiated program signals. More specifically, the signals reproduced by the reproducing head 45 of the reproducer 44, after amplification through an amplifier 52, are delivered to the input sides of a plurality of comparing channels 28, 29, 30, 31, etc., individually corresponding to the different wave signal transmitters from which the receiver 10**, for example, normally receives radiated program signals.

Each of the reproducers 44, **44*a*, 44*b*, 44*c*, 44*d*, etc., is identical in construction with the recorder 32 provided at each of the collaborator and monitoring receivers. Specifically, the reproducer 44 is schematically illustrated as comprising a pick-up head 45 identical with the recording head 44 and including a pick-up stylus 45*c* which follows the signal track along the cellulose record tape 34 during movement of this tape between a supply spool 47 and a take-up spool 48 under the influence of a driving sprocket 49. A synchronous motor and gear train unit 50 shaft connected to the driving sprocket 49 and including a synchronous motor arranged for energization from a suitable constant frequency current source 51 is utilized to drive the sprocket 49 and hence the tape 34 at the desired predetermined constant speed. The reproducers 44*a*, 44*b*, 44*c*, 44*d*, etc., respectively deliver their output signals to the comparing channels 28, 29, 30, 31, etc., through amplifiers 52*a*, 52*b*, 52*c*, 52*d***, etc.

The comparing channels 28, 29,30, 31, etc. are of identical arrangement, each being provided with a modulator 56 having an upper set of input terminals connected to the common channel 53 and a lower set of input terminals connected to the output terminals of one of the amplifiers **52*a*, 52*b*, etc., and having output terminals connected to the input terminals of a control tube unit 57 which in turn is arranged to control a signal repeating relay 58**. Suitable subscripts *a*, *b* and *c* have been employed to differentiate the identified comparing channel components as respectively provided in three of the four comparing channels 28, 29, 30 and 31.

As explained more fully below, one feature of the present invention relates to use of the reproducers 44, **44*a*, 44*b*, 44*c*, 44*d*, etc., to reproduce the recorded signals of the record tapes at an audio frequency rate, thereby to speed up the record tape decoding or comparing operation. Specifically, reproduction of the recorded signals in the reproducers 44, 44*a*, 44*b*, 44*c*, 44*d*, etc. is accomplished at identically the same record tape speed which is a constant multiple of the standardized record tape speed employed in the recorders 32** provided at the respective collaborator and monitoring receivers. The multiplication factor between the record tape speed in the reproducers and the standardized record tape speed in the recorders is perfectly of the order of 500. This means if the recorded signals range in frequency from .3 to 1 cycle per second, and are recorded on this basis, they will be reproduced in the reproducers at a frequency rate of 150 to 500 cycles per second.

The modulators 56, **56*a*, 56*b*, 56*c*, etc. individual to the comparing channels are of identical circuit arrangement and preferably are of the exact form described in the Bell System Technical Journal, vol. 18, 1939, at pages 315 to 337. Briefly considering the modulator 56 by way of example, an appreciable direct current voltage is developed across the output terminals connected to the input terminals of the control tube unit 57 when signal voltages of matching phase and amplitude are simultaneously impressed across the respective upper and lower sets of input terminals thereof. On the other hand, when no signal voltage is impressed across either set of input terminals or signal voltages of non-matching phase and amplitude are impressed across the two sets of input terminals, no voltage is developed at the output terminals of the modulator. Each of the control tube units 57, 57*a*, 57*b*, 57*c*, etc. may be of any conventional form. Briefly, each unit has the function of utilizing the direct current voltage impressed thereon when matching signal voltages are impressed upon the input terminals of the preceding modulator to produce sufficient current flow through the associated repeating relay 58 to effect operation of this relay, and of preventing this relay from operating under all other conditions, all in the manner explained below. To this end, each control tube may be normally biased beyond cut-off and the voltage developed by the preceding modulator during a matching signal period may be used to decrease this bias sufficiently to produce operation of the associated repeating relay. In this regard it is pointed out that anode voltage is applied to the anodes of the control tubes respectively provided in the units 57, 57*a*, 57*b*, 57*c*, etc. through the windings of the repeating relays 58, 58*a*, 58*b*, 58*c***, etc. respectively associated with these units.

As the reproduced signals are compared in the channels 28, 29, 30, 31, etc., to effect selective operation of the repeating relays **58*a*, 58*b*, 58*c*, etc., these relays are periodically operated selectively to control the card punch magnets of a card punch device 63. This device may be of any conventional form and for that reason only the essential components thereof have been diagrammatically illustrated in the drawings. Specifically, it comprises punch magnets 68, 68*a*, 68*b*, 68*c*, etc., individually corresponding to the wave signal transmitters normally received by the receiver 10, for example, and relative to which a statistically analyzable record card or tape 62 is adapted to be advanced on a step by step basis by means of an advancing sprocket 63 having teeth engaging the edge perforations of the card or tape and arranged for actuation by a magnet controlled stepping mechanism comprising an operating magnet 65. For the purpose of translating energization of this magnet into movement of the record card or tape 62 longitudinally thereof, a ratchet and pawl mechanism is provided which comprises a ratchet wheel 64 carried by the extended shaft of the advancing sprocket 63 and a pawl 67 engaging the toothed periphery of the ratchet wheel 64 and pivotally supported by a rotatably mounted and spring biased armature 66** which is attracted toward the pole face end of the magnet 65 when this magnet is energized.

In order to record the non-listening intervals, which are manifested as straight line segments in each record tape 34 reproduced in the reproducer 44, the translating equipment also includes a slow-to-operate non-listen relay 79 which is arranged directly to control a non-listen punch magnet 69 in the card punch device 63. Energization of this relay is under the control of a rectifier and control tube unit 70 having its input terminals connected to the channel 53. This unit includes a rectifier section which rectifies signal voltages delivered thereto from the reproducing head of the reproducer 44 and a control tube which is biased beyond cut off by the rectifier signal voltage to prevent the relay 79 from operating. Thus the relay 79 is only conditioned for operation when no signals are reproduced by the reproducing head 45.

For the purpose of periodically conditioning the repeating relays 58, 58*a*, 58*b*, 58*c*, etc. and the non-listen relay 79 for operation under the control of the comparing channels 28, 29, 30, 31, etc., a commutating device is provided which comprises a pair of commutating cams 72 and 73 commonly mounted for rotation with a drive shaft 74 which is rotated at a constant speed by means of a synchronous motor and gear train unit 75, the synchronous motor of which is adapted for energization from any suitable constant frequency alternating current source 75*a*. The commutating cams 72 and 73 are each constructed of insulating material and are respectively provided with cam lobes 72*a* and 73*a* for respectively closing the contact springs 77, 78 and 76 on a periodic basis. In order to step the described card advancing mechanism of the card punch device 61 during each interval when the punch magnets 68, 68*a*, 68*b*, 68*c*, 71, etc. of this device are deenergized, the cam lobe 73*a* is positioned to lag the cam lobe 72*a* in the direction of rotation of the two cams 72 and 73 so that the contacts 76 are only closed during intervals when the contacts 77 and 78 are open. As indicated above, the windings of the repeating relays 58*a*, 58*b*, 58*c*, etc. and the non-listen relay are adapted for energization from the current source which supplies anode potential to the control tubes of the control tube units 57, 57*a*, 57*b*, 57*c*, etc. and 70. Accordingly, the lower contact spring 77 and the lower contact spring 78 have been labeled +B for connection to the positive terminal of the anode current source. The punch magnets 68, 68*a*, 68*b*, 68*c*, etc. and stepping magnet 65 of the card punch device 61, on the other hand, are adapted for energization from a direct current source of appropriate voltage having its positive terminal connected to a grounded bus and its negative terminal connected to each of the magnet and relay terminals identified by the negative polarity symbol.

Before describing the operation of the system as a whole, it is pointed out that in accordance with the preferred mode of operating the system, the recorders 32 as provided at both the collaborator and monitoring receivers are continuously operative in the sense that the record tapes 34 thereof are continuously driven past the recording styli 33*c*. Periodically the field personnel of the system operators remove the record tapes having signal information recorded thereon from both the collaborator and monitoring receivers and replace the removed tapes with new tapes. As each tape is placed in operation in a recorder, the starting time thereof is accurately indicated thereon. Likewise, as each tape is removed from a recorder 32, the exact time of tape movement stoppage is suitably inscribed or otherwise marked thereon. Further, each tape, together with an identification of the collaborator home from which extracted or wave signal transmitter monitored, is mailed or otherwise transmitted to the central office of the system operators for translation into statistically analyzable form through the use of the equipment illustrated in Fig. 4 of the drawings. It will thus be apparent that the factor "time" is measured in terms of tape length and is susceptible of correlation in the decoding or tape comparing process. Further, with the record tapes 34 of the recorders 32 associated with the wave signal receivers used in gathering the desired statistical data in continuous operation, the recording facilities are at all times conditioned to produce on a time basis a record of any program which may be radiated by any wave signal transmitter normally received by any of the collaborator receivers as well as a record of each program actually received and reproduced by each of the collaborator receivers. Further, and since the record tapes 34 are continuously driven, a record is formed of the extent of use or non-use of each wave signal receiver provided in each collaborator's home.

Before considering the mode of operation of the pattern forming network 19 and recorder 32 to produce records uniquely representative of each program received and reproduced by the receiver 10, it is pointed out that each program, regardless of the character thereof, i. e. whether a newscast, a symphony orchestra or a dance band, is characterized by a dynamic pattern of unique distinctiveness. In other words, the mathematical possibility of two different programs having the same dynamic signal pattern is nil for all practical purposes. In accordance with the present invention, advantage is taken of this distinguishing characteristic of different programs which may be received by the collaborator receivers, in forming records the patterns of which uniquely identify the particular wave signal transmitters from which programs are received during particular intervals of a predetermined calendar period. To this end, the full wave rectifier 21 is utilized to first convert the signals appearing across the voice coil leads 16*a* into a voltage representing the mean power input to the transducer 17. The power input to this transducer is, of course, a direct measure of the dynamic pattern or form of the received signals. More specifically, and referring to the curves A1 and A2 illustrated in Fig. 2 of the drawings, it is pointed out that the curve A1 accurately represents the mean power of the musical number "Stars in Your Eyes" as played by Guy Lombardo and his Royal Canadians and as averaged over a three second period for an interval of three and a fraction minutes. In other words, when this musical selection is being received, the signal voltage appearing across the voice coil leads 16*a* has an envelope value as shown in Fig. 2, curve A1. The signals representative of the same musical number as rendered by Frank Sinatra and Xavier Cugat and reproduced by the receiver 10 are represented by the envelope value shown in Fig. 2, curve A2. Both of these envelope voltage patterns include after rectification by the rectifier 21 a direct current component having superimposed thereon higher frequency components representative of rapid changes in the dynamic pattern of the program and lower frequency components representative of exceedingly slow changes in the dynamic pattern of the program. The purpose of the filter 22 is to exclude from the signal voltage delivered to the amplifier 25 all components of the mean power signal pattern except those lying within a desired frequency range of approximately .3 to 1 cycle per second. Specifically, the frequency components within this band form a pattern which is sufficiently unique to distinguish either of the two described musical selections from any other program which could possibly be received by the receiver 10, as well as to distinguish these selections from each other. In general, the purpose of providing an upper limit of one cycle per second is to permit exceedingly slow tape speeds during recording without sacrificing fidelity of recording. On the other hand, a lower limit of .3 cycle per second permits all of the necessary information to be obtained, while preventing the passage of substantial direct currents which may not always be uniquely representative of the program received by the receiver 10.

Due to the inductive coupling between the two sections 23 and 24 of the filter, the voltage as passed through the filter is in the form of a non-periodic alternating voltage having a pattern which contains only frequency components within the indicated limits of the described frequency band. These voltages, respectively corresponding to the envelope curves A1 and A2 are as shown by the curves B1 and B2, respectively, in Fig. 2 of the drawings. The same voltage patterns are preserved at the output side of the amplifier 25 except for amplification of the voltage magnitudes, it being reiterated that this amplifier must be designed for amplification of the very low frequency signal voltages without substantial distortion.

In passing through the limiter 26, the signal voltage components represented by either of the waves B1 and B2 are so limited as to amplitude that the voltages impressed upon the driving coil 33*b* of the recording head 33 are of substantially the form shown by the curves C1 and C2, respectively. The mode of operation of this limiter may best be understood by referring to the characteristic curves of the selenium cell rectifier units 26*a* and 26*b* illustrated in Fig. 3 of the drawings. As there shown, the curve D1 represents the voltage-resistance characteristic of the selenium rectifier cell 26*a*, and the curve D2 represents the voltage-resistance characteristic of the selenium rectifier cell 26*b*. These characteristics are of identical pattern, but due to the fact that the two rectifier cells are oppositely poled across the output terminals of the amplifier 25, they extend in opposite directions away from the zero voltage axis. By reference to the curve D1 it will be apparent that as the instantaneous voltage of the curve B1, for example, rises in a positive direction, the ohmic resistance of the rectifier cell 26*a* is correspondingly decreased in accordance with the voltage-resistance relationship represented by the curve D1, to correspondingly decrease the load impedance across the output terminals of the amplifier 25 and thus limit the rise in voltage in the positive sense. Similarly, when the instantaneous voltage of the wave represented by the curve B1 tends to increase in a negative direction, the resistance of the selenium rectifier unit 26*b* is correspondingly decreased to decrease the load impedance across the amplifier 25 and thus limit the magnitude of the voltage rise. As a consequence of the described action of the two selenium rectifier cells 26*a* and 26*b*, the voltage wave B1 is converted into the form shown by the curve C1 before it is impressed upon the driving coil 33*b* of the recording head 33. Similarly, this limiter has the effect of converting the voltage wave B2 into the pattern C2. Since the recording stylus 33*c* is vibrated in accordance with the form of the voltage impressed upon the driving coil 33*b*, waves having the patterns C1 and C2 are respectively inscribed upon the cellophane tape 34 by this stylus when the identified musical numbers as played by the two identified orchestras are received by the receiver 10. From a comparison of the patterns of the waves C1 and C2, it will be readily apparent that these patterns are uniquely different on a frequency basis, and hence when reproduced for comparison purposes may be readily identified as representing different programs.

As indicated above, any wave pattern produced upon the record tape 34 in the manner just described is uniquely representative of a particular program since no two programs capable of being received by the receiver 10 can, within the realm of mathematical possibility, have the same dynamic signal pattern. Hence, as the receiver 10 is tuned to receive different programs originating at the same or different wave signal transmitting stations, reproducible records are produced on the tape 34 which uniquely represent each and every one of the programs received. Further, it will be apparent that the persistence interval of each recorded signal of particular pattern, representative of a particular program, is measured in terms of the length of tape required to record the signal. It will further be understood that since during predetermined calendar periods of days or weeks, the various intervals of use and non-use during each such period are clearly defined on the record tape 34. In this regard it is pointed out that when the receiver 10 is not in use, no signal voltage appears in the low frequency section 10*b* of the receiver and accordingly signal voltages are not delivered to the driving coil 33*b*. Hence, the stylus 33*c* remains in its neutral position to inscribe a straight line upon the record tape 34. Thus a record tape, as removed from the recorder 32 at the end of a given calendar period, will ordinarily contain a number of straight line record segments representing intervals of receiver non-use interspersed with recorded waves of different frequency patterns representing different programs which the receiver 10 has received during the period.

In translating the information recorded on the record tape 34 into statistically analyzable form, the translating equipment illustrated in Fig. 4 of the drawings is employed electrically to compare the signals recorded on this tape with the signals recorded on the tapes taken from the recording devices associated with the receivers monitoring the wave signal transmitters from which the receiver 10 normally receives program signals. In this regard it is pointed out that each calendar period of operation of the recorder 32 provided in combination with the receiver 10 is in practice made to correspond closely with the calendar period of operation of the recorder at each receiver used to monitor a wave signal transmitter from which program signals are normally received by the receiver 10. Preparatory to the actual translating operation, the record tape 34 is inserted in the reproducer 44 for movement past the reproducing stylus 45c and the record tapes extracted from the recording devices associated with the monitoring receivers are respectively inserted in the other reproducers 45a, 45b, 45c and 45d. All of the tapes thus inserted in the several reproducers cover like calendar periods and the starting times are brought accurately into coincidence by suitable adjustment of the tapes so that as the tapes are driven during the reproducing operation they are synchronized as to time. If desired, suitable automatic synchronizing facilities may be employed in conjunction with the tape drive mechanisms of the reproducers for maintaining the tapes in step during the reproducing operation. Also preparatory to translation of the record information into punched card form, a card individual to the record tape 34 extracted from the recorder 32 at the receiver 10 is placed in the card punch device 61 for step-by-step longitudinal movement under the influence of the driving sprocket 63. In this regard it is pointed out that the card 62 may be ruled transversely thereof to provide punch spaces individually representing successive predetermined increments of listening time. Also, the card 62 may be ruled longitudinally thereof to divide the record area into transverse sections individually corresponding to different programs. Preliminary to the decoding operation, the starting time as recorded on the tape 34 is code punched into an appropriate space provided transversely of the card 62 for this purpose.

With the reproducers 44, 44a, etc. and the card punch device 61 thus conditioned for operation and the pulsing cams 72 and 73 in operation, the relays 58, 58a, 58b, 58c, etc. and 79 function to punch the card 62 in accordance with the record information recorded on the record tape 34 as the signals respectively recorded on this record tape and the record tapes representative of the monitored wave signal transmitters are reproduced by the reproducers 44, 44a, 44b, etc. For explanatory purposes, it may be assumed that normally the receiver 10 is employed to receive program signals radiated from the four transmitters A, B, C and D to which the comparing channels 28, 29, 30 and 31 respectively correspond. It may be assumed further that the wave pattern first appearing on the record tape 34 during the reproducing operation is uniquely representative of a program received from the transmitter A. This wave causes a signal voltage to be developed by the reproducing head 45 which is amplified by the amplifier 52 and impressed across the upper input terminals of each of the modulators 56, 56a, 56b, etc. over the common channel 53. Concurrently therewith, a signal voltage of matching pattern is reproduced by the reproducer 44a, amplified by the amplifier 52a and impressed across the lower set of input terminals of the modulator 56. Also concurrently, signal voltages of non-matching pattern are developed by the reproducers 44b, 44c, 44d, etc., amplified by the amplifiers 52b, 52c, 52d, etc. and impressed upon the respective lower sets of input terminals of the modulators 56a, 56b, 56c, etc. Since the signal voltages impressed across the respective upper and lower input terminals of the modulator 56 match both in phase and in amplitude, a direct voltage is developed at the output terminals of this modulator which decreases the bias impressed between the input electrodes of the control tube included in the control tube unit 57 sufficiently to condition the repeating relay 58 for operation. On the other hand, since non-matching signal voltages are impressed upon the two sets of input terminals of each of the modulators 56a, 56b, 56c, etc. the respective control tube units 57a, 57b, 57c, etc. are not conditioned to permit operation of their respective associated repeating relays 58a, 58b, 58c, etc.

After the control tube unit 57 is conditioned to permit operation of the repeating relay 58 in response to the application of the matching signal voltages to the two sets of input terminals of the modulator 56, and when the cam lobe 72a next acts to close the contacts 77 and 78, a circuit is completed at the contacts 77 for energizing the repeating relay 58 from the B current source through the space current path of the control tube provided in the unit 57. At the contacts 78 a circuit is also completed for energizing the non-listen relay 79. Since, however, the control tube of the unit 70 is biased beyond cut-off due to the signal voltage applied to the input terminals of this unit, the relay 79 does not operate. The relay 58, when energized in the above-traced circuit, operates and closes its contacts 59 to complete an obvious circuit for energizing the punch magnet 68 individually corresponding to the program A. This magnet in attracting the punch armature associated therewith, punches a hole in the record card 62 in the particular space located transversely of the tape assigned to the wave signal transmitter A and in the particular space located longitudinally of the tape corresponding to the first increment of listening time.

Shortly after the magnet 68 is thus operated to produce a record on the card 62 indicative that a program received from the transmitter A was listened to by the user of the wave signal receiver 10 during the first increment of listening time, the cam lobe 72a rides out from under the cam follower portion of the lower contact spring 77a permitting the contacts 77 and 78 to open. At the contacts 78, the operating circuit for the non-listen relay 79 is interrupted. At the contacts 77, the repeating relay 58 is deenergized and restores to interrupt the operating circuit for the magnet 68 at the contacts 59. When this magnet is thus deenergized, it retracts its card punch armature in preparation for advancement of the card 62 to a position corresponding to the next succeeding increment of listening time under the influence of the card advancing sprocket 63.

After the magnet 68 is thus deenergized, the cam lobe 73a rides into engagement with the cam follower portion of the lower contact spring 76a to close the contacts 76 and thus complete an obvious circuit for energizing the stepping magnet 65 of the card punch device 61. In attracting its armature 66, this magnet functions to advance the card 62 to the next punch position under the influence of the ratchet and pawl mechanism 64, 67 and the advancing sprocket 63. After the card 62 has thus been advanced to the next punch position corresponding to the next succeeding increment of listening time, the cam lobe 73a rides out of engagement with the cam follower portion of the contact spring 76a permitting the contacts 76 to open and deenergize the magnet 65. Incident to the resulting release of the magnet armature 66, the pawl 67 is retracted to engage the next succeeding tooth of the ratchet wheel 64 and thus condition the card advancing mechanism to advance the card 62 to the next succeeding punch position.

From the above explanation it will be apparent that so long as the recording head 45 continues to reproduce a program or programs received from the particular wave signal transmitter A, the repeating relay 58 is periodically operated under the control of the pulsing cam 72 to effect periodic operation of the punch magnet 68 individually corresponding to the transmitter A, and thus produce a succession of punch holes longitudinally of the card 62 in the space allotted transversely of this card for recording transmitter A listening time. It will further be understood that the card advancing mechanism comprising the pulsing magnet 65 is periodically energized under the control of the pulsing cam 73 to advance the card 62 step-by-step during each interval when the repeating relay 58 is deenergized.

As the decoding operation proceeds, the repeating relays 58, **58*a*, 58*b*, etc. are selectively energized under the selective control of the comparing channels 28, 29, 30, 31, etc., selectively to control the punch magnets 68, 68*a*, 68*b*, 68*c*, etc. in the production of the punched card record identifying the particular transmitters listened to by the user of the wave signal receiver 10. Thus during each interval when the reproducing head 45 reproduces a signal the pattern of which matches the pattern of the signal being reproduced by the reproducer 44*b* and representative of a program radiated by the transmitter B, the modulator 56*a* reduces the bias of the control tube in the unit 57*a* to condition the repeating relay 58*a* for periodic operation under the control of the pulsing cam 72. Similarly, during each interval when the reproducing head 45 and the reproducing head of the reproducer 44*c* deliver signal voltages of matching pattern to the input terminals of the modulator 56*b*, this modulator reduces the bias of the control tube in the unit 57*b* to condition the repeating relay 58*b* for periodic operation under the control of the cam 72. The repeating relay 58*c* is similarly conditioned for operation during each interval when the reproducing heads of the reproducers 44 and 44*d* deliver matching signal voltages to the respective sets of input terminals of the modulator 56*c*, indicative of program reception from the transmitter D. The three repeating relays 58*a* and 58*b* respectively and directly control the punch magnets 68*a*, 68*b* and 68*c* individually corresponding to the transmitters B, C and D through their respective associated make contacts 59*a*, 59*b* and 59*c*. Further, so long as a signal voltage appears at the output side of the amplifier 52, the non-listen relay 79 is prevented from operating. It will also be understood that that record card 62 is periodically advanced under the control of the cam 73** during the interval immediately following each card punch operation.

As previously pointed out, since distinctive wave records are produced on the record tape 34 to identify all programs received by the receiver 10 during a particular calendar period, periods of non-use of the receiver 10 during this period are identified as straight segments on the record tape 34. This necessarily means that during the reproducing operation, no signal voltage is developed by the reproducing head 45 when the stylus **45*c* is following a straight line segment of the track on the record tape 34 identifying a receiver non-use period. Under these circumstances, the bias impressed between the input electrodes of the control tube in the unit 70 is reduced sufficiently to condition the non-listen relay 79 for operation. Accordingly, this relay is energized through the contacts 78 during each portion of a period of this type when the contacts 78 are closed. In operating, the relay 79 closes its contacts 80 to complete an obvious circuit for energizing the non-listen punch magnet 71. Each time this magnet operates, it punches a hole in the transverse portion of the card 62** alloted for the recording of non-listening time.

It may not infrequently occur that the user of the receiver 10 will receive programs from wave signal transmitters which are not monitored. These programs, like those received from the monitored transmitters, are converted into patterns uniquely representative thereof and recorded upon the record tape 10 in the manner just explained. During the decoding operation, however, such patterns obviously do not match the patterns of any of the signals recorded on the tapes taken from the recorders associated with the monitoring receivers. Hence, the repeating relays 58, **58*a*, 58*b*, 58*c*, etc. are prevented from operating. A signal voltage is, moreover, impressed upon the input terminals of the rectifier and control tube unit 70 to prevent the non-listen relay 79 from operating. Hence the record card 62 is advanced on a periodic basis without any holes being punched in the record card 62. Each longitudinal section of the card 62 representative of a particular increment of listening time in which a hole is not punched thus represents a period during which the receiver 10** was being used to receive a program from a non-monitored transmitter.

From the above explanation it will be apparent that the repeating relays and the non-listen relay coact with the card punch device 61 to produce a punched card pattern capable of statistical analysis which contains all necessary information regarding the extent of use of the receiver 10 during a particular calendar period, all of the particular intervals of the period during which it was in use, the particular monitored wave signal transmitters listened to during the period, and the extent to which programs originating at non-monitored transmitters were listened to. Further, by statistically analyzing the record information thus punched into a large number of cards representative of extended calendar periods of use of a large number of wave signal receivers, all of the previously mentioned factors pertaining to the sales effectiveness of particular programs may readily be determined by well known statistical methods usually involving the use of statistic analyzing machines.

It will also be partially apparent from the preceding explanation that the only limitation upon the factor of multiplication between the speed at which the record tape 34 is reproduced and the standardized speed of tape movement during recording is that imposed by the operating and release times of the repeating relays and the non-listen relay, and the response time of the card advancing mechanism and punch magnets in the card punch device 61. By way of illustration it may be assumed that the record information is to be analyzed on a five-minute listening time basis, i. e. that a record indication is to be punched into the record card 62 at the end of each five-minute interval of use or non-use of the wave signal receiver 10. Assuming that the standardized speed of tape movement during recording is .5 inch per hour (a speed satisfactory for high fidelity recording) of the sub-audible identification signals, and that the speed of record tape movement during reproduction is 500 times as great, i. e. 250 inches per hour, each hour of tape reproducing time represents 6,000 five-minute intervals of wave signal receiver use. Dividing the 3,600 seconds of reproducing time by the 6,000 five-minute intervals of listening time, it is found that the card punch operation representing each five-minute interval of listening time must occur in .60 second. This interval is entirely adequate to permit full and complete operation of the relay and card punch equipment in the manner explained above. Thus in this illustrative example, each card punch interval may be completed within a period of .10 second when effected by one of the repeating relays 58, 58*a*, 58*b*, 58*c*, etc., or the non-listen relay 79. This leaves a minimum of .5 second for advancement of the record card 62 to be completed. In the illustrative example just considered the cams 72 and 73 must be rotated at a speed of 66.66 revolutions per minute. From a consideration of the example just given, it will be understood that if the multiplication factor between the speed of reproduction and the standardized speed of tape movement during recording is increased while maintaining the sampling process on a five-minute listening time basis, the period allotted for response of the relay and card punch equipment is correspondingly reduced. Also, for a given standardized speed of tape movement during recording and a given multiplication factor, this period is reduced in direct proportion to the extent of listening time sampling interval. Using standard relay and card punch equipment, however, the above exemplary constants for recording and reproducing speeds may be regarded as good practice in a typical system operation where sampling on a five-minute listening time basis is desired.

As will be evident from the above explanation, each record formed on the record tape 34 in the recorder 32 is of a pattern uniquely representative of a particular program, regardless of the wave signal transmitter from which the program is radiated. This means that network programs which are concurrently radiated from two or more wave signal transmitters included in a network hook-up result in the production of records of identical patterns on the record strips 34 of the recorders combined with the collaborator receivers at which the programs are received. It not infrequently occurs that a collaborator receiver is located in the overlapping portions of the radiating area of two wave signal transmitters carrying the same network programs, which means that the receiver is capable of receiving the same program from either of two transmitters. On the other hand, it very infrequently occurs that a collaborator receiver is used to receive the same network program from more than two different wave signal transmitters included in the same network hook-up.

In order to provide for the production of distinguishable records respectively identifying the same program (and hence of the same pattern), but distinguishable as to the source of the program, i. e. the particular transmitter from which the program is received, the facilities illustrated in Fig. 5 of the drawings may be provided. As there shown, the receiver 10 is identical in type and circuit arrangement with that shown in Fig. 1 of the drawings and has combined therewith a pattern forming network 19 and recorder identical with the corresponding units of the receiver shown in Fig. 1 of the drawings. Accordingly, like reference characters have been used to identify corresponding units and unit components in each of Figs. 1 and 5 of the drawings. In order to facilitate an explanation of the manner in which the distinguishable records of the same program are formed, the local oscillator 18 of the receiver shown in Fig. 5 of the drawings has been illustrated as comprising an adjustable frequency determining circuit 18*a* having a tuning condenser gang connected for uni-control operation with the tuning condensers of the frequency selective circuits included in the radio frequency amplifier 12.

In brief, the facilities provided for producing the distinguishable records comprise an oscillator-modulator unit 85, a sharply tuned band pass filter 86, a diode rectifier 88, and a switching tube 89 connected in tandem in the order named. These components are arranged selectively to control the delivery of a transmitter identification signal to the driving coil 33*b* to the recording head 33 in accordance with the one of two particular transmitters from which the same programs may be concurrently received. The identification signal may be derived from a conventional 60 cycle source of alternating current indicated by the bracketing circuit 101. Preferably, and for reasons apparent from the following explanation, signal energy derived from this source is converted into a signal voltage of sub-multiple frequency by means of a frequency changer 102 prior to being impressed upon the driving coil 33*b* through the transformers 99 and 100 under the selective control of the switching tube 89. The frequency changer 102 may be of any desired commercial type although preferably is of the static type employing no vacuum tubes, manufactured and sold by the Lorain Products Corporation of Lorain, Ohio. Devices of this type are commercially available which are capable of converting 60 cycle alternating voltages into signal voltages of 16⅔ cycles per second without the use of moving parts or thermionic tubes.

More specifically considered, the oscillator-modulator 85, filter 86 and diode rectifier 88 are arranged to render the switching tube 89 conductive when programs are received by the receiver 10 from a predetermined wave signal transmitter, such, for example, as the transmitter A. In this regard it will be understood that in order to condition the receiver to receive programs from the transmitter A, the frequency determining circuit 18*a* of the local oscillator 18 must be tuned to a predetermined resonant frequency. This frequency is utilized to identify reception of programs from the particular transmitter A. To this end, a portion of the signal energy developed in the resonant circuit 18*a* during program reception from the transmitter A is impressed between the cathode and third or modulator grid of the pentagrid oscillator-modulator tube 85*a* by means of a small coupling coil 93 inductively related to the inductance element of the local oscillator frequency determining circuit 18*a*. The oscillator section of the oscillator-modulator 85 is comprised of a fixed tuned parallel resonant tank circuit 91 connected between the first grid and cathode of the tube 85*a* through a cathode biasing network 90. The output circuit of the oscillator-modulator tube 85*a* includes the second grid of the tube 85*a* as an output electrode and a feed-back coil 92 inductively related to the inductance element of the frequency determining circuit 91. The output electrodes of the tube 85a, i. e. the anode and cathode thereof, are coupled to the first section 86a of the filter 86, the second section 86b of which feeds the diode rectifier 88. This rectifier includes a load resistor 96 which is shunted by a radio frequency by-pass condenser 97 and is connected in series with a source of biasing potential 98 between the input electrodes of the switching tube 89. The voltage of the source 98 is negatively applied to the control grid of the tube 89 and is of sufficient magnitude to bias this tube beyond cut-off in the absence of a rectified voltage across the load resistor 96. Anode potential supplied by a suitable direct current source having a positive +B terminal is applied to the oscillator anode through the coil 92, and to the anode of the oscillator-modulator tube 85a through the inductance element of the first filter section 86a, and is impressed upon the screen electrode of this tube through a voltage dropping resistor 94 by-passed to ground by means of a radio frequency by-pass condenser 95.

The band pass filter 86 is sharply tuned to pass the difference frequency between the output frequency of the local oscillator 18 and the output frequency of the oscillator-modulator 85 when, and only when, the receiver 10 is tuned for the reception of program signals radiated from a predetermined one of the two transmitters included in the same network hook-up to radiate the same programs. For example, if the apparatus is to be used in distinguishing between programs received from the two transmitters A and B and the receiver 10 is tuned to receive program signals from the transmitter A when the local oscillator 18 is tuned to have an output frequency of 1,360 kc., the oscillator section of the oscillator-modulator 85 may be fixed tuned to have an output frequency of 2360 kc. in which case the filter 86 is designed sharply to pass 1000 kc. signals only.

Briefly to consider the mode of operation of the described apparatus, it may be assumed that it is desired to distinguish between two network stations A and B which carry the same program. To achieve this, the apparatus shown in Fig. 5 is arranged to provide the record signals produced by station A with a distinguishing marker. Furthermore, it will be assumed that the receiver 10 is provided with an IF amplifier having a mid-frequency of 460 kc., that station A has a carrier frequency of 900 kc. and that station B has a carrier frequency of 1200 kc., and that the filter 86 has a mid-frequency of 1000 kc. When, therefore, the receiver 10 is conditioned to receive a network program originating at the transmitter A, the local oscillator 18 is tuned to have a frequency of 900 kc.+460=1360 kc. and the fixed tuned oscillator-converter 85 is set to the frequency 1360 kc.+1000 kc.=2360 kc. The voltage picked up by coil 93 and impressed between the third grid and cathode of tube 85a is electrically mixed with the output of the local oscillator section of the oscillator-modulator 85 to produce a beat frequency of 1000 kc. to which the filter 86 is tuned. Accordingly, the signal voltage is passed by the filter 86 and rectified by rectifier 88. The rectified output of the tube 88 has a polarity such that the grid of the tube 89 is driven positive to render this tube conductive. Under these circumstances the received program signals (as derived from the audio frequency section of the receiver 10, and converted into sub-audible signals of a predetermined pattern and recorded on the record tape 34), have superimposed upon them the low frequency of 16⅔ c. p. s. produced by the frequency divider 102. The record produced is therefore as shown in Fig. 7. Preferably, the extent to which current flow through the tube 89 is permitted, under the conditions just described, is so limited that the 16⅔ cycle component of the recorded signal is of relatively small amplitude as compared with the amplitude of the recorded sub-audible signals. As a result, a record of the character shown in Fig. 7 of the drawings is produced on the record tape 34 during reception of the program segment represented by the normal record shown in Fig. 6 which is described later in the specification. These two records, while of identical pattern, are distinguishable by the 16⅔ cycle signal component forming a part of the record shown in Fig. 7 of the drawings. Obviously, recording of the 16⅔ cycle transmitter identification signal continues so long as the receiver 10 remains tuned for the reception of program signals originating at the transmitter A.

On the other hand, when the receiver 10 is tuned for the reception of program signals from the transmitter B, the signal voltage extracted from the local oscillator 18 (1660 kc.) is electrically mixed with the signal developed by the local oscillator section of the oscillator-modulator 85 (2360 kc.) to produce a beat frequency signal voltage of 700 kc. which is not passed by the filter 86. The bias voltage of battery 98 maintains the tube 89 in a nonconductive condition and the signal from the frequency divider 102 is not impressed on the recording head 33b and hence the record produced is as shown in Fig. 6.

From the preceding explanation it will be understood that the described facilities for superimposing a transmitter identification signal upon the sub-audible signal representative of a particular program can only occur when the receiver 10 is tuned to a particular wave transmitter signal, i. e. the transmitter A in the example considered above. It will also be understood that in actual practive each collaborator and monitoring receiver provided in an area where the described overlap condition exists is equipped with the described facilities for distinguishing the records formed as a result of reception of program signals from either of two network transmitters carrying the same programs. Hence, during the decoding operations as described above, the same decoding equipment may be used, it being noted that matching of the recorded transmitter identification signals, as well as matching of the sub-audible program identification signals, is required in order to produce a response of the appropriate repeating relay included in the transmitting equipment shown in Fig. 4 of the drawings. More specifically, this equipment may be so designed that comparison of two matching sub-audible signal patterns will not produce a response of the appropriate repeating relay unless the two reproduced records are either (1) both modified to include the transmitter identification signal, or (2) neither record is characterized by this signal. The purpose of utilizing the frequency divider 102 to reduce the frequency of the transmitter identification signal to a sub-multiple of the available 60 cycle signal frequency now becomes apparent. Thus, and assuming that the multiplication factor of 500 is employed between the record tape speed during reproduction and the standardized record tape speed used in recording, the use of a 60 cycle transmitter identification signal during recording would result in the production of a corresponding signal of 30,000 cycles during reproduction. This frequency substantially exceeds the ability of conventional reproducers to reproduce the signal with reasonably good fidelity. If, however, a transmitter identification signal of 16⅔ cycles per second is employed during recording, this signal is reproduced at a frequency of 8,333 cycles during reproduction, a frequency value capable of being handled on a high fidelity basis by cellophane tape recorders and reproducers of standard commercial construction.

It will also be apparent from the preceding explanation that the present invention affords a unique solution to the problem of program identification without relying upon mechanical connections between the receiver and recording apparatus to produce the program or transmitter identification records. More important, it completely obviates substantially all of the complex problems involved in utilizing energy extracted from the high frequency section of a receiver to produce record identifications of the transmitters or programs received by a receiver during a given calendar use period. Thus, the only case in which signal energy extracted from the high frequency section of a receiver is necessary for identification purposes, is the case just described in which a collaborator receiver is located in the overlapping portion of the radiating area of two transmitters included in the same network hook-up. In this particular case, however, the problem is reduced to one of identifying a single wave signal transmitter, which means that only one signal voltage of high frequency need be dealt with. In other words, no problem of scanning a wide frequency range and locating closely spaced signal channels within the range is involved. Aside from the advantages just referred to, the equipment provided in combination with each collaborator receiver is simple in the extreme, is of low cost as compared with other devices for the same purpose, and may easily be installed by relatively non-skilled personnel. Thus in the system arrangement shown in Fig. 1 of the drawings, the only installation step required is that of making two connections to the voice coil leads of the receiver. When the Fig. 5 arrangement is employed, on the other hand, the additional steps of locating the pick-up coil 93 in proximity to the frequency determining circuit of the local oscillator of the receiver and calibrating the frequency determining circuit 91 are required. These steps are, however, relatively simple and may easily be performed by non-skilled personnel.

While there has been described what are at present considered to be the preferred embodiments of the invention, it will be understood that various modifications can be made therein which are within the true spirit and scope of the invention as defined in the appended claims.

I claim:

1. In a system for statistically determining the audience ratings of programs radiated from wave signal transmitters, a wave signal receiver tunable to receive programs from any one of a plurality of said transmitters and provided with a signal channel for transmitting audio frequency program signals to a transducer, means coupled to said channel for rectifying program signal voltages appearing therein during program reception, filter means for selecting a predetermined band of frequency components from the rectified signal voltages which have a pattern identifying the particular program being received, and means responsive to the selected band of frequency components for producing a record identifying the particular program being received.

2. In a system for statistically determining the audience ratings of programs radiated from wave signal transmitters, a wave signal receiver tunable to receive programs from any one of a plurality of said transmitters and provided with a signal channel for transmitting audio frequency program signals to a transducer, means coupled to said channel for rectifying program signal voltages appearing therein during program reception, filter means for selecting a predetermined band of frequency components from the rectified signal voltages which have a pattern identifying the particular program being received, means for limiting the amplitude of the selected components, and means for recording the selected components of limited amplitude, thereby to produce a record identifying the particular program being received.

3. In a system for statistically determining the audience ratings of programs radiated from wave signal transmitters, a wave signal receiver tunable to receive programs from any one of a plurality of said transmitters and provided with a signal channel for transmitting audio frequency program signals to a transducer, means coupled to said channel for rectifying program signal voltages appearing therein during program reception, filter means for selecting from the rectified signals certain components which have a pattern representative of the dynamic pattern of the program being received, and means responsive to the selected signal components for producing an indication uniquely representative of the particular program being received.

4. In a system for statistically determining the audience ratings of programs radiated from a plurality of wave-signal transmitters, a wave-signal receiver tunable to receive programs from any one of said transmitters and provided with a signal channel for transmitting audio-frequency program signals to a transducer, means coupled to said channel for rectifying program-signal voltages appearing therein during program reception, filter means for selecting a predetermined band of frequency components from the rectified signal voltages to produce a signal pattern uniquely characteristic of the particular program being received, and means for comparing such signal pattern with each of a plurality of standard signal patterns respectively uniquely characteristic of the program signals transmitted from each of said transmitters.

5. In a system for statistically determining the audience ratings of programs radiated from a plurality of wave-signal transmitters, a wave-signal receiver tunable to receive programs from any one of said transmitters and provided with a signal channel for transmitting program signals to a transducer, means coupled to said channel for rectifying program signal voltages appearing therein during program reception, filter means for selecting from said rectified signals predetermined frequency components to provide a signal pattern uniquely representative of the dynamic pattern of the program being received, and means fed by said filter means for comparing said signal pattern with a plurality of standard signal patterns.

6. In a system for statistically determining the audience ratings of programs radiated from a plurality of wave-signal transmitters, a wave-signal receiver tunable to receive programs from any one of said transmitters and provided with a signal channel for transmitting audio-frequency program signals to a transducer, means coupled to said channel, comprising filter means, operative to select from said program signals a predetermined band of sub-audible frequency components to provide a signal pattern uniquely characteristic of the particular program being received, and means fed by said filter means for comparing such signal pattern with each of a plurality of standard signal patterns respectively uniquely characteristic of the program signals transmitted from each of said transmitters.

7. In a system for statistically determining the audience ratings of programs radiated from a plurality of wave-signal transmitters, a wave-signal receiver tunable to receive programs for any one of said transmitters and provided with a signal channel for transmitting program signals to a transducer, means coupled to said channel, comprising filter means, operative to select from said program signals predetermined sub-audible frequency components to provide a signal pattern uniquely representative of the dynamic pattern of the program being received, and means fed by said filter means for comparing said signal pattern with a plurality of standard signal patterns.

8. In a system for statistically determining the audience ratings of programs radiated from a plurality of wave-signal transmitters, a wave-signal receiver tunable to receive programs from any one of said transmitters and provided with a signal channel for transmitting program signals to a transducer, means coupled to said channel, comprising filter means, operative to select from said program signals a predetermined band of frequency components, the highest of which is less than 100 cycles per second, to provide a signal pattern uniquely respective of the program signals being received, and means fed by said filter means for comparing said signal pattern with a plurality of standard signal patterns.

SERGE A. SCHERBATSKOY.

References Cited in the file of this patent

UNITED STATES PATENTS

| Number | Name | Date |
|---|---|---|
| 1,994,232 | Schuck, Jr. | Mar. 12, 1935 |
| 2,213,886 | Potter | Sept. 3, 1940 |
| 2,214,342 | Neufeld | Sept. 10, 1940 |
| 2,257,094 | Goldstine | Sept. 30, 1941 |
| 2,270,899 | Roder | Jan. 27, 1942 |
| 2,344,562 | Potter | Mar. 21, 1944 |
| 2,354,836 | Rusch | Aug. 1, 1944 |
| 2,411,494 | Bliss | Nov. 19, 1946 |
| 2,410,424 | Brown | Nov. 5, 1946 |
| 2,455,052 | Fisher | Nov. 30, 1948 |
| 2,466,804 | Giffen et al. | Apr. 12, 1949 |
| 2,532,731 | Potter | Dec. 5, 1950 |